US012695813B2

(12) United States Patent
Mohanty et al.

(10) Patent No.: US 12,695,813 B2
(45) Date of Patent: Jul. 28, 2026

(54) SUBSCRIPTION BASED 5G SESSION VALIDATION

(71) Applicant: Oracle International Corporation, Redwood City, CA (US)

(72) Inventors: Geeta Mohanty, Bengaluru (IN); Rajiv Krishan, Cary, NC (US); Uri Baniel, Buffalo Grove, IL (US)

(73) Assignee: Oracle International Corporation, Redwood City, CA (US)

( * ) Notice: Subject to any disclaimer, the term of this patent is extended or adjusted under 35 U.S.C. 154(b) by 85 days.

(21) Appl. No.: 18/754,582

(22) Filed: Jun. 26, 2024

(65) Prior Publication Data

US 2026/0006101 A1 Jan. 1, 2026

(51) Int. Cl.
*H04L 67/55* (2022.01)
*H04L 67/141* (2022.01)

(52) U.S. Cl.
CPC ............ *H04L 67/55* (2022.05); *H04L 67/141* (2013.01)

(58) Field of Classification Search
CPC .............................. H04L 67/55; H04L 67/141
USPC ........................................................ 709/224
See application file for complete search history.

(56) References Cited

U.S. PATENT DOCUMENTS

| | | | | |
|---|---|---|---|---|
| 11,283,883 B1* | 3/2022 | Krishan | .................. | H04W 8/00 |
| 2021/0321251 A1* | 10/2021 | Colom Ikuno | ....... | H04W 76/11 |
| 2023/0007456 A1* | 1/2023 | Krishan | ................ | H04M 15/66 |
| 2023/0090589 A1* | 3/2023 | Cakulev | ................ | H04W 76/10 |
| | | | | 370/329 |
| 2024/0244414 A1* | 7/2024 | Zhao | ........................ | H04L 69/40 |

OTHER PUBLICATIONS

3GPP (hereinafter 3GPP), "3GPP TS 23.502 V18.5.0 (Mar. 2024)", Apr. 15, 2024, tech-invite.com, Section of "5.2.13 BSF Services", web.archive.org/web/20240415181338/https://www.tech-invite.com/3m23/toc/tinv-3gpp-23-502_zzzj.html#e-5-2-13 (Year: 2024).*

* cited by examiner

*Primary Examiner* — Ruolei Zong

(57) ABSTRACT

Various embodiments of the present technology generally relate to systems and methods for validating 5G sessions at a binding support function (BSF) based on subscription-based notifications. In certain embodiments, a BSF system may comprise one or more processors, and a memory having stored thereon instructions that, when executed, cause the one or more processors to create a binding record associated with a 5G communication session, receive a subscription request from a Policy Control Function (PCF) for a session revalidation event associated with the 5G communication session, and initiate a revalidation timer based on the subscription request. The BSF system may send a notification request to the PCF based on the revalidation timer expiring, and delete the binding record based on a response to the notification request.

18 Claims, 4 Drawing Sheets

COMPUTING SYSTEM    401

STORAGE SYSTEM    403

SOFTWARE    405

SUBSCRIPTION BASED 5G SESSION VALIDATION PROCESS    406

COMM. I/F SYS.    407

PROCESSING SYSTEM    402

USER. I/F SYS.    409

400

SUBSCRIPTION BASED 5G SESSION VALIDATION

TECHNICAL FIELD

Various embodiments of the present technology generally relate to management of networks, such as fifth generation (5G) communications networks. More specifically, embodiments of the present technology relate to systems and methods for improved management of communication sessions within networks.

BACKGROUND

In some communication network architectures, such as those using third generation partnership project (3GPP) standards, service may be implemented by establishing a user communication session, such as a UE (User Equipment) session or a PDU (packet data unit or protocol data unit) session. To support a voice or data call, a number of network functions (NFs) within a 5G network may work together to manage aspects of the session.

In an example process of establishing a communication session, user equipment (UE) may register with the network, and trigger (e.g., via a session management function, SMF) the creation of a PDU session in order to exchange data with the network. As part of the PDU session creation process, a policy control function (PCF) may be assigned to the session to generate policy rules for the session to control quality of service (QOS) and charging for the session. The PCF assigned to the session may register with a binding support function (BSF), and the BSF can create a binding record for the session in its database. The binding record can ensure that an application function (AF) request for a certain PDU session can reach the relevant PCF having the PDU session information for AF or Rx sessions associated with the PDU session. Rx interface messages enable the transport of application-level session information from an AF to a PCF or PCRF (Policy and Charging Rules Function), and an Rx session may be used to allocate and manage data resources for a PDU session. NF service consumers seeking to discover the PDU session binding for a UE may do so by querying the BSF using a discovery application programming interface (API) provided by the BSF. The BSF network function assigned to the session can retain session binding information such as N7 session parameters, N7 endpoint, and Diameter identity for a PCF instance, and a PDU session linked to a function (e.g., a PCF) by a binding record may be referred to as a binding session.

However, PDU sessions may constantly be created and ended, and the BSF may have no way to reliably determine whether a PDU session is still active and valid. For example, the BSF may be aware of a session's validity if Rx authorization authentication request (AAR) sessions from an AF to a PCF are successful. But if there are no Rx sessions established, there may be no procedure by which a BSF can periodically determine the validity of PDU session as per 3GPP technical specification (TS) 29.521. Thus, a BSF may not accurately detect and identify PCF bindings related to stale PDU sessions, which are not active in a PCF but are still active in the BSF. If stale binding records are not deleted or cleaned up, resources can be wasted, or other inefficiencies can occur. In some examples, there may be large numbers of stale bindings remaining within a BSF database. Keeping records of stale or invalid PDU sessions at a BSF may result in performance degradation and slowed processing for active calls.

Further, 3GPP R17 added the ability for a BSF to store bindings of a PCF against a particular UE based on a Subscription Permanent Identifier (SUPI) for the UE. In this case, the PCF may be known in 3GPP as the 'PCF for a UE'. For PCF to UE bindings, the BSF bindings have nothing to do with any PDU session, and may be referred to as a UE session. In particular, a PDU session may occur when an IP address is allocated to a UE, so that, for example, the UE will be able to browse the Internet or make VoIP calls. PCF storage of bindings at the BSF, which is related to the establishment of a PDU session is illustrated in 3GPP TS 29.513 5.2.1. Meanwhile, a UE session may occur when a UE has just been activated (e.g., when a phone is turned on). PCF storage of binding at the BSF, which is related to UE registration, may be illustrated in 3GPP TS 29.513 5.1.1 or 3GPP TS 29.513 5.1.1 5.6.1. PCF binding at the BSF related to PDU sessions and UE sessions, respectively, may be managed similarly by the BSF, and share difficulties in being audited for validity by the BSF. Therefore, PDU and UE sessions may generally be referred to herein as "5G sessions" or "PDU/UE sessions." Accordingly, there exists a need for improved 5G session validation operations.

The information provided in this section is presented as background information and serves only to assist in any understanding of the present disclosure. No determination has been made and no assertion is made as to whether any of the above might be applicable as prior art with regard to the present disclosure.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments herein relate to systems, methods, and computer-readable storage media for performing subscription based 5G session validation. In an embodiment, a Binding Support Function (BSF) system may comprise one or more processors, and a memory having stored thereon instructions. The instructions, upon execution, may cause the one or more processors to create a binding record associated with a 5G communication session, receive a subscription request from a Policy Control Function (PCF) for a session revalidation event associated with the 5G communication session, and initiate a revalidation timer based on the subscription request. The BSF system may send a notification request to the PCF based on the revalidation timer expiring, and delete the binding record based on a response to the notification request.

In some embodiments, the BSF system may receive the response to the notification request, delete the binding record based on the response indicating the 5G communication session is invalid, and restart the revalidation timer based on the response indicating the 5G communication session is valid. In some examples, the BSF system may register a Network Function (NF) profile with a Network Repository Function (NRF) indicating support for session revalidation. According to certain embodiments, the BSF system may increment a failure count value when no response to the notification request is received, and delete the binding record when the failure count exceeds a threshold value. The BSF system may restart the revalidation timer when no response to the notification request is received and the failure count does not exceed the threshold value. In another example, the BSF system may resend the notification request when no response to the notification request is received and the failure count does not exceed the threshold value. In some embodiments, the BSF system may receive an Rx protocol message associated with the 5G communication session and directed to the PCF, route the Rx protocol message to the PCF, receive a response to the Rx protocol message from the PCF, and restart the revalidation timer based on the response to the Rx protocol message. In some examples, a duration of the revalidation timer is set by an operator of the BSF. In some embodiments, the BSF system may associate the binding record with a PCF set of multiple PCFs including the PCF, and send the notification request to another PCF in the PCF set when the PCF is unavailable. The BSF system may delete the binding record when each PCF in the PCF set is unavailable, or returns an unexpected response indicating neither that the 5G communication session is invalid or valid.

In an alternative embodiment, a method may comprise operating a Binding Support Function (BSF) of a mobile network, including creating a binding record associated with a 5G communication session, receiving a subscription request from a Policy Control Function (PCF) for a session revalidation event associated with the 5G communication session, initiating a revalidation timer based on the subscription request, sending a notification request to the PCF based on the revalidation timer expiring, and deleting the binding record based on a response to the notification request.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein.

Figure 1:
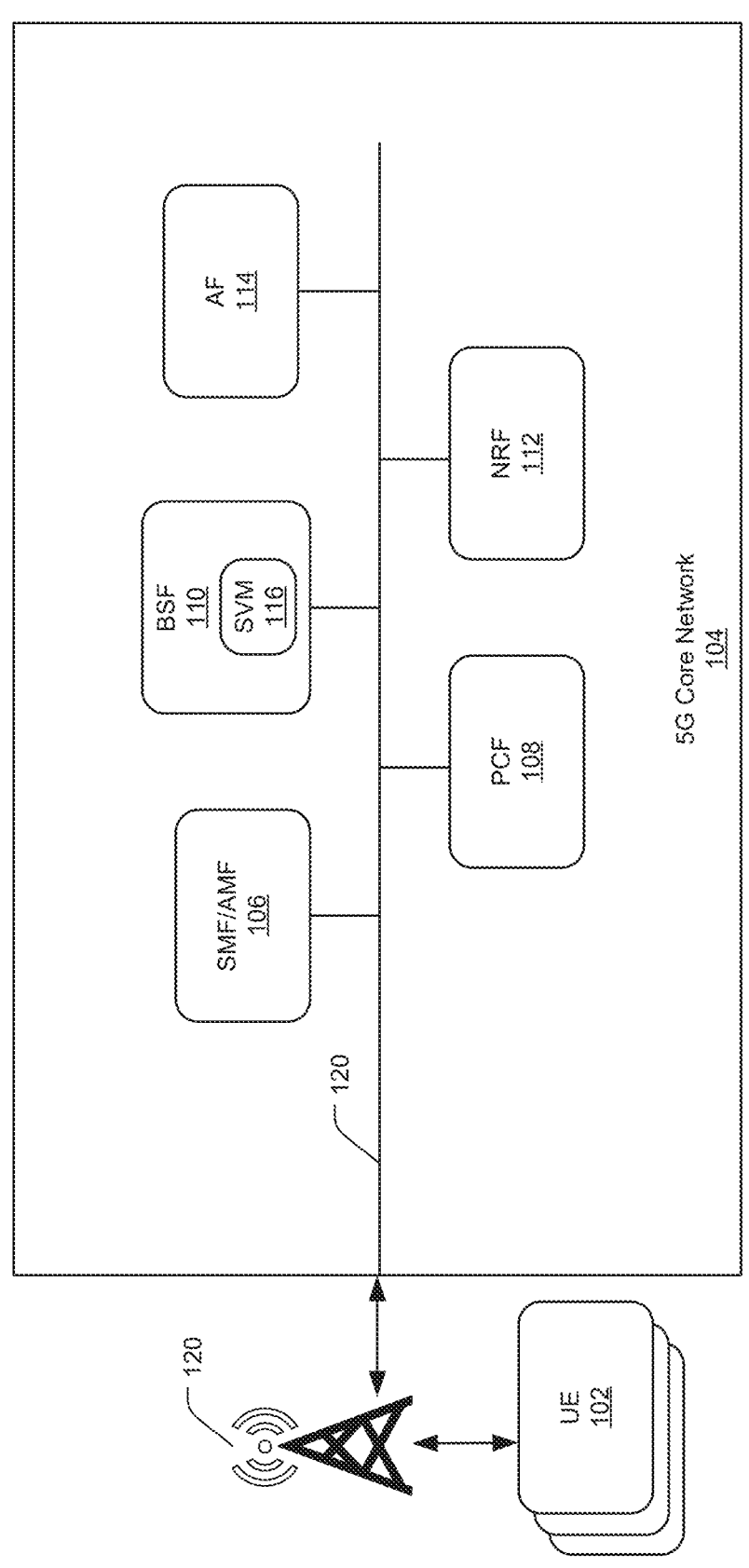
FIG. 1 is a diagram of a system configured to implement subscription based 5G session validation, in accordance with certain embodiments of the present disclosure.

Some components or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure. The following description and associated figures teach the best mode of the invention. For the purpose of teaching inventive principles, some aspects of the best mode may be simplified or omitted.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules or nodes, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

FIG. 1 is a diagram of a system 100 configured to implement subscription based 5G session validation, in accordance with certain embodiments of the present disclosure. The example system 100 may include a mobile network implementing 3GPP (3rd Generation Partnership Project) communication standards (e.g., using the 29.521 TS), although the present disclosure may apply to other communication networks. In particular, the mobile network may include components and elements to implement a cellular network, such as a 5G Core (5GC or 5GS) network 104. The system 100 may include one or more user equipment (UE) 102 connected to 5G network 104 via network connectivity components 120.

Each or any of UE 102, 5G network 104 and its components, and network 120 may be implemented via computers, servers, hardware and software modules, or other system components. The components of 5G network 104, or the physical devices implementing them, may be co-located, remotely distributed, or any combination thereof. The elements of system 100 may include components hosted or situated in the cloud, implemented as software modules potentially distributed across one or more server devices or other physical components, or otherwise implemented.

UE 102 may be a device, system, or module that may utilize the resources of the 5G network 104, such as to establish communications with another UE. Communication sessions may include, but are not limited to, IMS calls (Internet Protocol Multimedia subsystem), other cell phone calls, internet or other data connections, UE registrations (as PCF 108 may register UE 102 bindings at the BSF 110 as part of this communication; see, e.g., 3GPP TS 29.513 5.1.1, 29.513 5.6.1, 23.502 4.16.1/.2/.11/.12), or any and all other types of communications sessions over 5G networks. UE 102 may include devices such as cell phones, tablets, modems, vehicles, desktop or laptop computers, televisions or set-top boxes, smart home devices, voice over IP (VOIP) devices, internet of things (IoT) devices, or any and all other systems that may utilize a cellular network.

Network connectivity components 120 may provide communication paths between UE 102 and 5G network 104. Network connectivity components 120 may comprise components that enable communication over communication links, such as network cards, ports, radio frequency (RF) modules, telecommunications channels, cell towers, switches, routers, processing circuitry and software, or other communication components. Network connectivity components 120 may include metallic, wireless, cellular, or optical links, using various communication formats and protocols. In some examples, network connectivity components 120 may simply be referred to as a "network" by which systems or modules are connected or communicate.

The 5G network 104 may comprise a mobile communications network that provides services to UEs 102 through the network connectivity components 120. 5G network 104 may include a plurality of components, modules, or network functions (NFs) configured to provide mobile communication services via the corresponding 5G Core communications protocols. Some components of 5G network 104 may be configured to communicate and operate with other networks, such as 4G networks, networks controlled by other network operators, or other network environments. 5G core network 104 may include a session management function (SMF) or access and mobility management function (AMF) 106, a policy control function (PCF) 108, a binding support function (BSF) 110, a network or NF repository function (NRF) 112, and an application function (AF) 114.

5G network 104 may include an SMF or AMF 106 (or both), configured to handle session establishment, modification, and release. When a UE 102 connects to the 5G network 104, an SMF or AMF 106 may initiate the session creation. An SMF may include various functionality relating to subscriber sessions, e.g., session establishment, modification, and release. An AMFs primary tasks may include registration management, connection management, reachability management, mobility management, and various function relating to security and access management and authorization.

PCF 108 may be assigned to a subscriber session (e.g., a UE or a PDU session) created when a UE 102 registers with the 5G network 104 or when a UE attempts establishment of a PDU session, respectively. The PCF 108 may generate policy rules for the session to control quality of service and charging for the session, and may register the session with the BSF 110. The PCF 108 may also register with the NRF 112, and may provide metadata or other information to the NRF 112 identifying capabilities or configuration settings for the PCF 108. A PCF 108 may operate as an individual unit, or as part of a PCF set, where a 5G session may be managed by any available or most convenient PCF from a corresponding PCF set.

BSF 110 may maintain a list, database, or other data structure of binding records describing which PCF 108 is assigned to a subscriber session, or which PCF 108 is assigned to a subscriber registration related association. The BSF 110 may provide the binding support management service (Nbsf_Management service), allowing the BSF to provide 5G session binding functionality, which can ensure that an AF 114 request for a certain session can reach the relevant PCF 108 having the session information. BSF 110 may obtain information about a PCF 108 and its capabilities from the NRF 112, from messages received from the PCF, or a combination thereof. The BSF 110 may create a binding record when a PCF 108 registers a session with BSF 110. AF 114 seeking to discover the session binding for a UE 102 may do so by querying the BSF 110 using a discovery application programming interface (API) provided by the BSF. The BSF 110 may also register with the NRF 112, and may provide metadata or other information to the NRF 112 identifying capabilities or configuration settings for the BSF 110.

The NRF 112 may be a monitoring element which includes and maintains a repository of NF profiles for available NF instances (including BSF 110 and PCF 108). The NF profiles may identify what services or resources each NF provides, and potentially metadata provided by the NF, which may specify vendor-specific features supported by the NF but not included in standard 3GPP specifications. For example, NFs may register with the NRF to provide registration information and metadata for the NF to the NRF 112 for storing in the repository. Once an NF is registered with the NRF, the NRF may provide information for the NF in response to discovery requests. For example, an NF may send a discovery request to the NRF 112 including search criteria, and the NRF may issue a discovery response providing identifying information and metadata for NFs in the repository matching the search criteria. Consumer NFs can subscribe to receive information about producer NF instances that have registered with the NRF 112.

The AF 114 may be configured to manage and provide application services to subscribers and UEs 102. AF 114 may interact with the BSF 110 to determine which PCF 108 is associated with a particular 5G session or with a particular UE (subscriber/SUPI), and the AF 114 may interact with the PCF 108 to manage properties of communication sessions for various resources.

After a binding record becomes inactive or stale, the PCF 108 may send a delete binding record request or other message for deleting the stale binding record from the binding record database of the BSF 110. But in some instances, the BSF 110 may never receive a delete request. For example, some error within the network may result in a deletion request failing to be successfully transmitted or completed, such as if a PCF suffers a critical failure and loses its own record of active 5G session entries, due to lost data packets, or for other reasons. Accordingly, the BSF 110 may have many session binding records pertaining to invalid or stale 5G sessions, inhibiting the performance of the BSF 110 and the 5G network 104. In order to perform session validation operations, the BSF 110 may include a session validation module (SVM) 116. The SVM 116 may include a module configured to determine whether binding sessions maintained by the BSF 110 are still valid, or have become stale and should be deleted.

In order to audit the binding session records, the SVM 116 may support subscription-based session validation. The SVM 116 may include vendor-specific features allowing a PCF 108 to subscribe to the BSF 110 for "session revalidation" events. A new event in "BSFevent" may be added to BSF 110, which may follow the OpenAPI standard defined in TS 29.521. The PCF 108 may use the 3GPP release 17-introduced Subscription and Notification procedure with BSF 110, for example by discovering (e.g., via NRF 112) and selecting a BSF 110 which supports a "Session Revalidation" feature in "supportedVendorSpecificFeatures," registered to NRF in the BSF's NFProfile. The PCF 108 may then subscribe a "session revalidation" event for the 5G session binding at the BSF 110. The BSF 110 can use the subscription of the PCF 108 to periodically notify the PCF that a session expiry event has triggered, for example based on a timer set by the PCF 108, a vendor or operator for the BSF 110, or a combination thereof. The response of the PCF 108 to the session expiry notification can be used by the SVM 116 to determine whether the session is still active and valid, or is stale and should be deleted. Without the subscription from the PCF 108 to the BSF 110, the BSF 110 may have no mechanism by which to query the PCF on the status of a 5G session. An example process for subscription based 5G session validation is discussed in regard to FIG. 2.

Figure 2:
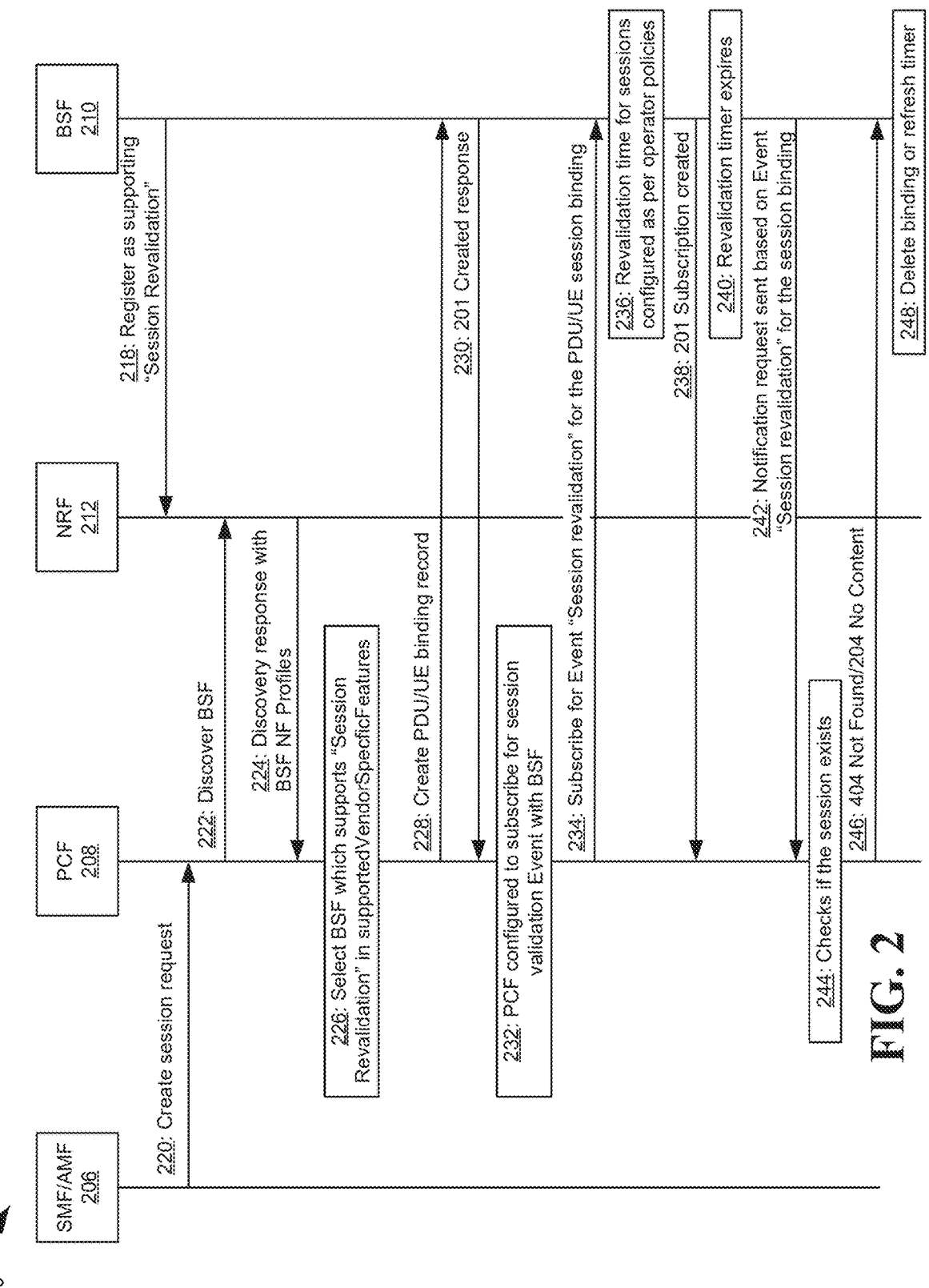
FIG. 2 depicts a flow diagram of an example method to perform subscription based 5G session validation, in accordance with certain embodiments of the present disclosure.

FIG. 2 is a flow diagram of a system 200 configured to implement subscription based 5G session validation, in accordance with certain embodiments of the present disclosure. In particular, the diagram 200 may depict a process flow within a 5G communication network by which a binding record is created, and then audited to determine whether the session is still valid or has become stale. Diagram 500 may depict an example message and processing flow between an SMF/AMF 206, PCF 208, NRF 212, and BSF 210. The components in diagram 200 may correspond to elements described in regard to FIG. 1.

At 218, BSF 210 may register with NRF 212. As part of the registration process, the BSF 210 may specify that it supports "Session Revalidation", by including it within "supportedVendorSpecificFeatures" in the BSF's NFprofile. The NRF 212 may store the NFprofile for BSF 210, so that the BSF 210 and its supported features are discoverable by other NFs within the network.

At 220, a UE may connect to the network, causing SMF/AMF 206 to issue a create session request to PCF 208. The create session request may assign PCF 208 (or an associated PCFset) to manage the PDU session or UE session.

At 222, the PCF 208 may query the NRF 212 to discover a BSF 210 to manage the binding record for the 5G session. In response, at 224, the NRF 212 may provide one or more NF profiles for available BSFs in the network, which may include BSF 210.

At 226, the PCF 208 may select a BSF that supports "Session Revalidation" in "supportedVendorSpecificFeatures", based on the received NF profiles. In particular, the PCF 208 may include vendor specific custom attributes or code that directs the PCF to select BSFs that support "Session Revalidation" over BSFs that do not (e.g., in all instances, or for 5G sessions with particular features or attributes).

At 228, the PCF 208 may issue a create PDU/UE binding record request to the selected BSF 210. In the case of a PDU binding record request, the PCF 208 may provide an IP address, DNN, S-NSSAI, or similar information for use as a key. In the case of the PCF 208 registering with the BSF for a UE, the PCF 208 may send Subscription Permanent Identifier (SUPI) information to the BSF 210 as the binding key for pcfBinding for the session (see, e.g., 3GPP TS 29.521 5.6.2.2 and 5.6.2.10). SUPI may be a unique identifier in 5G allocated to a SIM card of a UE. In response to the binding record request, BSF 210 may create the binding record associating PCF 208 with the PDU/UE session, and issue a "201 Created" response to PCF 208, at 230.

PCF 208 may be configured to subscribe to the BSF 210 for session validation events, at 232, according to vendor-specific attributes or code at the PCF 208. At 234, the PCF 208 may provide a particular Event Value to BSF 210, during creation of subscriptions for events on the already-created session binding (PDU or UE). For example, PCF 108 may subscribe by invoking "Nbsf_Management_Subscribe", by following the OpenApi Standards, which allow "anyOf: -type: string" for BsfEvent: "Session Revalidation". The PCF may submit the subscription request as an HTTP POST request with event "session revalidation" "{apiRoot}/nbsf-management/<apiVersion>/subscriptions".

The BSF 210 may accept the event subscribed by PCF 208, at 236, and may set a revalidation time for the 5G session as per operator policies. The BSF 210 may use a local configured revalidation time or another input to decide a timer duration or length. The time duration may control when the binding session should be revalidated with PCF 208, on the event of the timer expiring for the binding session. When the event subscription has been confirmed and the time period established, the BSF 210 may send a successful response indicating acceptance in "BsfSubscriptionResp," such as "201 Subscription created", at 238.

Once the subscription has been established, the BSF 210 may monitor the revalidation timer until it expires, at 240. The timer expiring may trigger the "Session revalidation" event, and in response, the BSF 210 may issue a notification request to PCF 208 for the associated session binding, at 242. For example, the BSF 210 may invoke a Nbsf_Management_Notify service operation to send a notification to PCF 208 for the session binding on the event of "Session Validity" timer expiry.

At 244, the PCF 208 may receive the notification, and may check if the session identified in the notification exists as an active session. The PCF 208 may provide different responses, at 246, depending on whether the identified session is active or not. For example, the PCF 208 may send a "204 No content" response if the session is still valid and exists, and a "404 Not Found" error if the session does not exist or is not valid. Based on the response, the BSF 210 may determine the session is invalid and delete the associated binding record, or determine that the session is still active and refresh the Session Validity timer, at 248.

In some embodiments, the binding record creation, the subscription creation, or both can be performed for a PCFset instead of an individual PCF 208. An NFset, of which a PCFset may be a type, may be a group of a same type NFs that can function as backup or redundant modules to service an operation. For example, if the primary PCF 208 servicing a 5G session crashes or becomes unavailable, another PCF in the PCFset may be able to continue servicing the session. Accordingly, if a BSF 210 attempts to send a session revalidation notification, but the original or primary PCF 208 is not available, the notification may be sent to another PCF in the same PCFset.

Similarly, BSF 210 may be part of a BSFset. When the BSF 210 creates a binding record, it may be created for a BSFset, so that PCFs (or other NFs) can access any BSF from the BSFset to access the binding record. If the primary BSF 210 goes down, another BSF in the BSFset may take over the Session Validity timer and issue session revalidation notifications to the appropriate PCF(s) 208.

The proposed subscription based 5G session validation process may allow a BSF 210 to periodically send notifications to PCF 208 as a means to query a session's validity. When the session is no longer valid, the BSF 210 may be able to delete the stale associated biding record, thereby preventing the BSF from maintaining junk binding records. The proposed solution may be fully compliant with existing 3GPP procedures and open APIs, and may be backward compatible due to vendor specific feature negotiation with NRF 212. An example method by which a BSF may validate 5G sessions is described in regard to FIG. 3.

Figure 3:
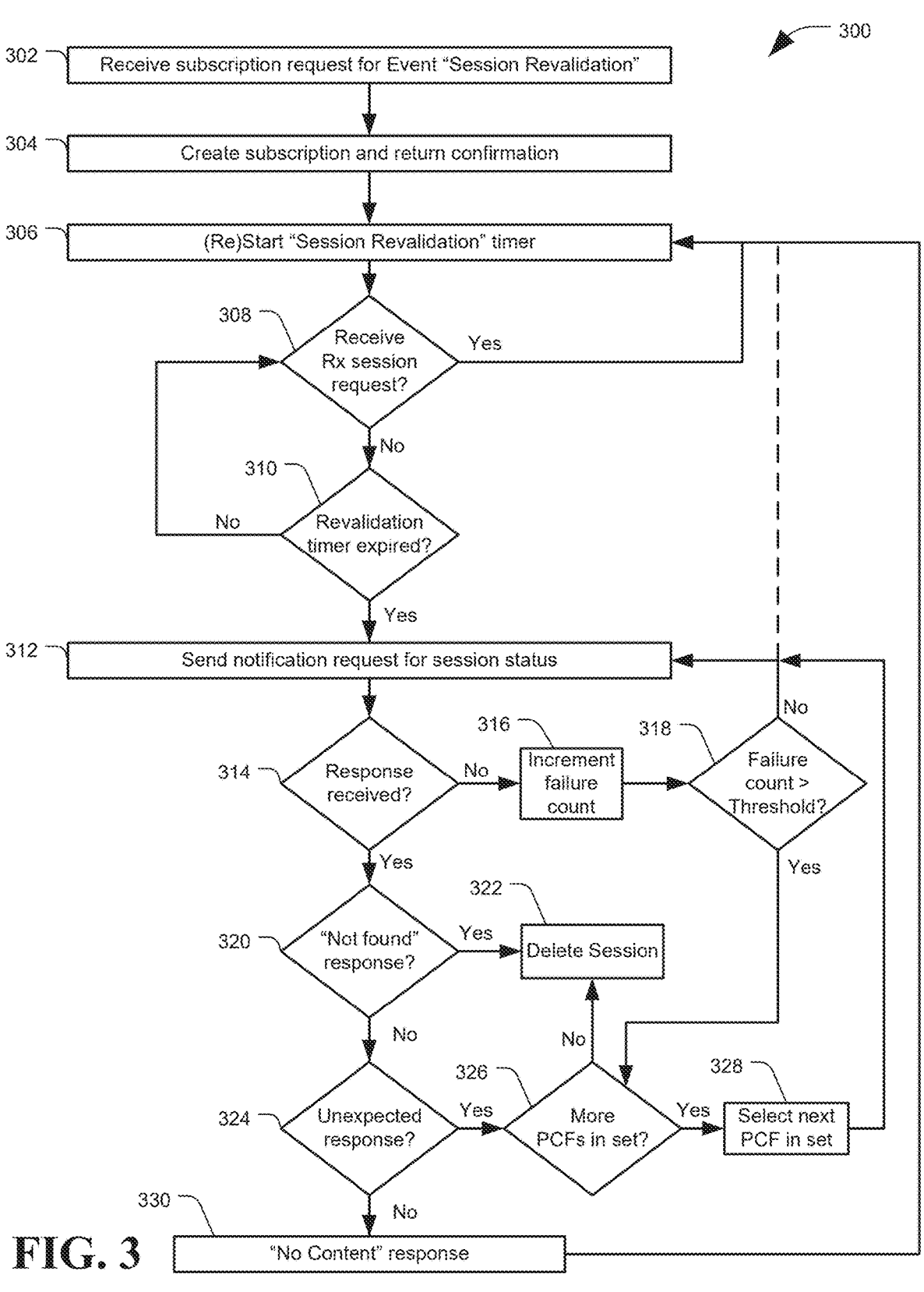
FIG. 3 depicts a flowchart of an example method to perform subscription based 5G session validation, in accordance with certain embodiments of the present disclosure.

FIG. 3 depicts a flowchart 300 of an example method to perform subscription based 5G session validation, in accordance with certain embodiments of the present disclosure. In particular, flowchart 300 depicts an example process by which a BSF may validate a 5G session using a subscription-based model. The method of flowchart 300 may be executed by a BSF, such as BSF 110 of FIG. 1 or BSF 210 of FIG. 2.

At 302, the method may include receiving a subscription request for an Event; e.g., a "Session revalidation" event, as defined in vendor specific features at a BSF. At 304, the method may include creating a subscription associated with a PCF that issued the subscription request, and a specified binding record, SUPI, or other identifying feature included in the subscription request. In this manner, the BSF may track which binding record and 5G session the subscription is associated with, so that the BSF is aware of which binding record to delete when a session validation operation fails. Upon creating the subscription, the BSF may return a subscription confirmation notification to the PCF that issued the subscription request.

Based on creating the subscription, the method may include starting a "Session Validation" or "Session Revalidation" timer, at 306. The timer may include a time value that counts down until it expires (or counts up until it reaches a specified value), triggering a "Session Revalidation" event. In another example, a "session inactivity timer", indicating a time since a "last access" timestamp has been updated for the session, may be compared against the revalidation timer value, and when the inactivity timer exceeds the revalidation timer, the event may be triggered. The duration of the revalidation timer may be specified by an operator of the BSF, or otherwise specified. After the timer starts, the BSF may monitor it for when it expires, or the expiration of the timer may automatically trigger an event at the BSF.

At 308, the method may include determining whether an Rx session request has been received for the binding record or the associated PDU/UE session. Rx may include an interface protocol used by, e.g., AFs as part of providing services for a session. For Rx requests, an AF may send the Rx request to the BSF. The BSF may look up the binding record to determine a PCF associated with the communication session, and then may act as a proxy or forwarder to automatically forward the Rx message to the appropriate PCF, and in turn may receive the response from the PCF to route to the AF. In this manner, the BSF may be able to determine whether a session is still active based on the communication exchange. Any other messaging that passes through the BSF and may indicate that a session is still active, and therefore may update a "last access" timestamp for the PDU/UE session, may also be monitored at 308. Accordingly, if the BSF has received an Rx session request, it may restart the "session revalidation" timer, at 306, as the BSF may know that the PDU/UE session is still active and valid.

When no Rx session request is received, at 308, the method may include making a determination whether the revalidation timer has expired, at 310. If not, the method may include continuing to monitor for Rx session requests, at 308. However, if the timer has expired, a "session validation" or "session revalidation" event may be triggered, and the method may include sending a notification request for a status of the associated PDU/UE session, at 312. The notification request may include identifying information for a particular session or its associated UE, enabling the PCF to perform a lookup operation for the relevant PDU/UE session.

At 314, a determination may be made whether a response has been received to the notification request from the PCF. If no response has been received, it may indicate that the notification request or the response was lost in transit, that the PCF is unavailable, or that the response was otherwise lost. In this case, the method may include incrementing a failure count, at 316, and determining whether the failure count has exceeded a threshold, at 318. The threshold amount of failures may be set by a vendor or operator of the BSF, or otherwise selected. If the failure count has not exceeded the threshold, the method may include restarting the "session revalidation" timer, at 306, or attempting to send a notification request to the PCF immediately, at 312, depending on implementation. If the failure count has exceeded the threshold, the method may include determining whether the PCF that requested creation of the binding record was part of a PCF set, and if so, determining whether there is another PCF in the PCF set that the BSF could attempt to contact for the session status, at 326. If so, the method may include selecting the next PCF in the set, and sending a notification request to that PCF, at 312. However, if there are no more PCFs to contact, at 326, the method may include determining that the 5G session is now invalid, and may include deleting the binding record for the session, at 322.

In some embodiments, the BSF may also check for a health of the target PCF based on information from an NRF. For example, the BSF may subscribe to the NRF for health status updates of PCFs for which the BSF is maintaining binding records, and may receive notifications regarding connection or availability problems for a PCF. Based on the health notifications, the BSF may adjust the failure threshold, or adjust how quickly to attempt re-sending notification requests for the session status.

If a response to the notification request was received, at 314, the method may include determining whether the received response was "404 not found", or another response indicating that the specified session is invalid, at 320. If the response indicates the session is invalid, the method may include deleting the binding record for the session, at 322. However, if the response does not indicate that the session is invalid, the method may include determining whether the received response was an "unexpected" response, at 324. An unexpected response may include any response that neither indicates the session is invalid (e.g., such as a "404 not found" response) nor indicates the session is still valid (e.g., such as a "204 no content" response). For example, the BSF may receive a "500 Internal Server Error" response, which may indicate the targeted PCF instance has a specific problem and cannot provide an expected response. If an unexpected response is received, and there is another PCF in the PCF set, the other PCF may be available to provide an expected response. Accordingly, the method may include determining whether there are other PCFs in the set, at 326. If not the method may include determining that the 5G communication session is no longer valid, and deleting the session binding record, at 322. However, if there is another PCF in the set, the method may include selecting the next PCF in the set, at 328, and resending the notification request, at 312.

If the received notification response is neither a "404 not found" response, at 320, nor an unexpected response, at 324, the response may be a "204 no content" response, or another response indicating that the specified session is still valid, at 330. Accordingly, the method may include restarting the "session revalidation" timer, at 306. A computing system configured to perform the operations and methods described herein is provided in regard to FIG. 4.

Figure 4:
FIG. 4 is a diagram of a system configured to implement subscription based 5G session validation, in accordance with certain embodiments of the present disclosure.

FIG. 4 is a diagram of a system 400 configured to implement subscription based 5G session validation, in accordance with certain embodiments of the present disclosure. System 400 may be an example of an apparatus including a computing system 401 that is representative of any system or collection of systems in which the various processes, systems, programs, services, and scenarios disclosed herein may be implemented. For example, computing system 401 may be an example user equipment 102, network connectivity components 120, 5G Core network 104, or any of the subcomponents depicted in system 100 of FIG. 1. Examples of computing system 401 include, but are not limited to, server computers, desktop computers, laptop computers, routers, switches, web servers, cloud computing platforms, and data center equipment, as well as any other type of physical or virtual server machine, physical or virtual router, container, and any variation or combination thereof.

Computing system 401 may be implemented as a single apparatus, system, or device or may be implemented in a distributed manner as multiple apparatuses, systems, or devices. Computing system 401 may include, but is not limited to, processing system 402, storage system 403, software 405, communication interface system 407, and user interface system 409. Processing system 402 may be operatively coupled with storage system 403, communication interface system 407, and user interface system 409.

Processing system 402 may load and execute software 405 from storage system 403. Software 405 may include and implement subscription based 5G session validation process 406, which may be representative of any of the operations for creating a subscription at a BSF from a PCF, and then using the subscription notifications to verify the validity of a 5G session, as discussed with respect to the preceding figures. When executed by processing system 402, software 405 may direct processing system 402 to operate as described herein for at least the various processes, operational scenarios, and sequences discussed in the foregoing implementations. Computing system 401 may optionally include additional devices, features, or functionality not discussed for purposes of brevity.

In some embodiments, processing system 402 may comprise a micro-processor and other circuitry that retrieves and executes software 405 from storage system 403. Processing system 402 may be implemented within a single processing device but may also be distributed across multiple processing devices or sub-systems that cooperate in executing program instructions. Examples of processing system 402 may include general purpose central processing units, graphical processing units, application specific processors, and logic devices, as well as any other type of processing device, combinations, or variations thereof.

Storage system 403 may comprise any memory device or computer readable storage media readable by processing system 402 and capable of storing software 405. Storage system 403 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 403 may also include computer readable communication media over which at least some of software 405 may be communicated internally or externally. Storage system 403 may be implemented as a single storage device but may also be implemented across multiple storage devices or sub-systems co-located or distributed relative to each other. Storage system 403 may comprise additional elements, such as a controller, capable of communicating with processing system 402 or possibly other systems.

Software 405 (including subscription based 5G session validation process 406 among other functions) may be implemented in program instructions that may, when executed by processing system 402, direct processing system 402 to operate as described with respect to the various operational scenarios, sequences, and processes illustrated herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software, virtualization software, or other application software. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system as described herein. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors.

For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 407 may include communication connections and devices that allow for communication with other computing systems (not shown) over communication networks (not shown). Examples of connections and devices that together allow for inter-system communication may include network interface cards, antennas, power amplifiers, radio-frequency (RF) circuitry, transceivers, and other communication circuitry. The connections and devices may communicate over communication media to exchange communications with other computing systems or networks of systems, such as metal, glass, air, or any other suitable communication media.

Communication between computing system 401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof.

As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more memory devices or computer readable storage medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A Binding Support Function (BSF) system, comprising:
   one or more processors; and
   a memory having stored thereon instructions that, upon execution by the one or more processors, cause the one or more processors to:
   create a binding record associated with a 5G communication session;
   receive a subscription request from a Policy Control Function (PCF) for a session revalidation event associated with the 5G communication session;
   initiate a revalidation timer based on the subscription request;
   send a notification request to the PCF based on the revalidation timer expiring;
   delete the binding record based on a response to the notification request, including:
   increment a failure count value when no response to the notification request is received; and
   delete the binding record when the failure count exceeds a threshold value.

2. The BSF system of claim 1, wherein the instructions comprise further instructions that, upon execution by the one or more processors, cause the one or more processors to:
   receive the response to the notification request;
   delete the binding record based on the response indicating the 5G communication session is invalid; and
   restart the revalidation timer based on the response indicating the 5G communication session is valid.

3. The BSF system of claim 2, wherein the instructions comprise further instructions that, upon execution by the one or more processors, cause the one or more processors to:
   register a Network Function (NF) profile with a Network Repository Function (NRF) indicating support for session revalidation.

4. The BSF system of claim 3, wherein the instructions comprise further instructions that, upon execution by the one or more processors, cause the one or more processors to:
   restart the revalidation timer when no response to the notification request is received and the failure count does not exceed the threshold value.

5. The BSF system of claim 3, wherein the instructions comprise further instructions that, upon execution by the one or more processors, cause the one or more processors to:
   resend the notification request when no response to the notification request is received and the failure count does not exceed the threshold value.

6. The BSF system of claim 5, wherein the instructions comprise further instructions that, upon execution by the one or more processors, cause the one or more processors to:
   receive an Rx protocol message associated with the 5G communication session and directed to the PCF;
   route the Rx protocol message to the PCF;
   receive a response to the Rx protocol message from the PCF; and
   restart the revalidation timer based on the response to the Rx protocol message.

7. The BSF system of claim 6, wherein a duration of the revalidation timer is set by an operator of the BSF.

8. The BSF system of claim 7, wherein the instructions comprise further instructions that, upon execution by the one or more processors, cause the one or more processors to:
   associate the binding record with a PCFset of multiple PCFs including the PCF; and
   send the notification request to another PCF in the PCFset when the PCF is unavailable.

9. The BSF system of claim 8, wherein the instructions comprise further instructions that, upon execution by the one or more processors, cause the one or more processors to:
   delete the binding record when each PCF in the PCF set is unavailable, or returns an unexpected response indicating neither that the 5G communication session is invalid or valid.

10. A method comprising:
   operating a Binding Support Function (BSF) of a mobile network, including:

creating a binding record associated with a 5G communication session;
   receiving a subscription request from a Policy Control Function (PCF) for a session revalidation event associated with the 5G communication session;
   initiating a revalidation timer based on the subscription request;
   sending a notification request to the PCF based on the revalidation timer expiring;
   deleting the binding record based on a response to the notification request, including:
      incrementing a failure count value when no response to the notification request is received; and
      deleting the binding record when the failure count exceeds a threshold value.

11. The method of claim 10, further comprising:
   receiving the response to the notification request;
   deleting the binding record based on the response indicating the 5G communication session is invalid; and
   restarting the revalidation timer based on the response indicating the 5G communication session is valid.

12. The method of claim 10, further comprising:
   registering a Network Function (NF) profile with a Network Repository Function (NRF) indicating support for session revalidation.

13. The method of claim 10, further comprising:
   restarting the revalidation timer when no response to the notification request is received and the failure count does not exceed the threshold value.

14. The method of claim 10, further comprising:
   resending the notification request when no response to the notification request is received and the failure count does not exceed the threshold value.

15. The method of claim 10, further comprising:
   receiving an Rx protocol message associated with the 5G communication session and directed to the PCF;
   routing the Rx protocol message to the PCF;
   receiving a response to the Rx protocol message from the PCF; and
   restarting the revalidation timer based on the response to the Rx protocol message.

16. The method of claim 10, wherein a duration of the revalidation timer is set by an operator of the BSF.

17. The method of claim 10, further comprising:
   associating the binding record with a PCFset of multiple PCFs including the PCF; and
   sending the notification request to another PCF in the PCFset when the PCF is unavailable.

18. The method of claim 17, further comprising:
   deleting the binding record when each PCF in the PCF set is unavailable, or returns an unexpected response indicating neither that the 5G communication session is invalid or valid.

* * * * *